US008212401B2

(12) United States Patent
Linkhart et al.

(10) Patent No.: US 8,212,401 B2
(45) Date of Patent: Jul. 3, 2012

(54) REDUNDANT ISOLATION AND BYPASS OF CRITICAL POWER EQUIPMENT

(75) Inventors: Charles O. Linkhart, Shingle Springs, CA (US); Yatish C. Mishra, Davis, CA (US); George Macricostas, Incline Village, NV (US)

(73) Assignee: Stratascale, Inc., Sacramento, CA (US)

( * ) Notice: Subject to any disclaimer, the term of this patent is extended or adjusted under 35 U.S.C. 154(b) by 45 days.

(21) Appl. No.: 12/184,142

(22) Filed: Jul. 31, 2008

(65) Prior Publication Data

US 2009/0033154 A1    Feb. 5, 2009

Related U.S. Application Data

(60) Provisional application No. 60/953,882, filed on Aug. 3, 2007.

(51) Int. Cl.
*H02J 9/04* (2006.01)
(52) U.S. Cl. ......................................................... 307/64
(58) Field of Classification Search ................ 307/64
See application file for complete search history.

(56) References Cited

U.S. PATENT DOCUMENTS

| | | | | |
|---|---|---|---|---|
| 4,340,823 A * | 7/1982 | Miyazawa | ....................... | 307/66 |
| 5,081,367 A * | 1/1992 | Smith et al. | ....................... | 307/64 |
| 5,581,133 A * | 12/1996 | Smith et al. | ....................... | 307/64 |
| 5,642,002 A * | 6/1997 | Mekanik et al. | ................ | 307/64 |
| 5,646,459 A * | 7/1997 | Hatate et al. | .................... | 307/85 |
| 5,739,595 A | 4/1998 | Mekanik et al. | | |
| 5,745,356 A | 4/1998 | Tassitino, Jr. et al. | | |
| 5,770,897 A * | 6/1998 | Bapat et al. | .................... | 307/127 |
| 5,811,960 A * | 9/1998 | Van Sickle et al. | ................ | 322/4 |
| 6,134,124 A * | 10/2000 | Jungreis et al. | ................ | 363/34 |
| 6,150,736 A * | 11/2000 | Brill | ................................ | 307/64 |
| 6,191,500 B1 * | 2/2001 | Toy | ................................... | 307/64 |
| 6,304,006 B1 * | 10/2001 | Jungreis | ........................ | 307/64 |
| 6,433,444 B1 * | 8/2002 | de Vries | ........................ | 307/64 |
| 6,538,345 B1 | 3/2003 | Maller | | |
| 6,664,659 B1 | 12/2003 | Adi | | |
| 6,737,762 B2 * | 5/2004 | Koenig | ........................... | 307/48 |
| 6,768,223 B2 * | 7/2004 | Powell et al. | ................... | 307/64 |
| 6,768,224 B2 | 7/2004 | Shen et al. | | |
| 6,774,507 B1 | 8/2004 | Byers et al. | | |
| 6,906,434 B1 | 6/2005 | Koeppe et al. | | |
| 6,906,435 B1 * | 6/2005 | Lin et al. | ......................... | 307/66 |
| 7,061,141 B2 * | 6/2006 | Yamamoto | ..................... | 307/65 |
| 7,105,949 B2 * | 9/2006 | Wang et al. | ..................... | 307/51 |
| 7,119,457 B1 | 10/2006 | Flegel | | |
| 7,129,599 B2 | 10/2006 | Divan et al. | | |
| RE39,710 E | 7/2007 | Young et al. | | |
| 7,265,458 B2 * | 9/2007 | Edelen et al. | ................... | 307/65 |
| 7,274,112 B2 * | 9/2007 | Hjort et al. | ....................... | 307/64 |
| 7,400,066 B2 * | 7/2008 | Tassitino et al. | ................ | 307/46 |
| 7,418,314 B2 * | 8/2008 | Rasmussen et al. | .......... | 700/286 |
| 7,432,615 B2 * | 10/2008 | Hjort | ............................... | 307/64 |

(Continued)

*Primary Examiner* — Adi Amrany
(74) *Attorney, Agent, or Firm* — Nixon Peabody LLP; Jennifer Hayes

(57) ABSTRACT

A redundant power distribution system and a method of providing redundant isolation are described. The system includes a normal operation circuit branch and an external bypass circuit branch, enhanced with a generator bypass connection, both connected to a critical load, the generator bypass circuit branch including a diverse, redundant power source. The normal operation circuit branch delivers power to the critical load during normal operations and the external bypass circuit branch delivers power to the critical load from the redundant power source via the enhanced generator bypass connection during bypass operations. The system also allows the critical load to be electrically isolated from all of or a portion of the normal operation circuit branch.

33 Claims, 10 Drawing Sheets

U.S. PATENT DOCUMENTS

| | | | |
|---|---|---|---|
| 7,450,406 B2* | 11/2008 | Glauser | 363/71 |
| 7,456,518 B2* | 11/2008 | Hjort et al. | 307/64 |
| 7,459,803 B2* | 12/2008 | Mosman | 307/64 |
| 7,462,955 B2 | 12/2008 | McNamara et al. | |
| 7,514,815 B2* | 4/2009 | Paik et al. | 307/64 |
| 7,554,220 B2 | 6/2009 | Sugawara | |
| 7,566,988 B2* | 7/2009 | Heber et al. | 307/44 |
| 7,566,990 B2* | 7/2009 | Loucks et al. | 307/64 |
| 7,569,949 B2* | 8/2009 | Lathrop et al. | 307/64 |
| 7,687,936 B2 | 3/2010 | Mariasis et al. | |
| 7,714,462 B2* | 5/2010 | Chen | 307/65 |
| 7,888,816 B2* | 2/2011 | Zajkowski | 307/64 |
| 7,939,968 B2* | 5/2011 | Hjort et al. | 307/66 |
| 2003/0184160 A1* | 10/2003 | Yamamoto | 307/64 |
| 2004/0084965 A1* | 5/2004 | Welches et al. | 307/64 |
| 2004/0201282 A1* | 10/2004 | Kado et al. | 307/64 |
| 2005/0043859 A1* | 2/2005 | Tsai et al. | 700/286 |
| 2005/0073783 A1 | 4/2005 | Luo et al. | |
| 2005/0162792 A1 | 7/2005 | Wang et al. | |
| 2005/0200205 A1 | 9/2005 | Winn et al. | |
| 2006/0022524 A1* | 2/2006 | Bryde et al. | 307/64 |
| 2006/0028069 A1* | 2/2006 | Loucks et al. | 307/130 |
| 2006/0046107 A1* | 3/2006 | Lindsey | 429/13 |
| 2006/0138867 A1* | 6/2006 | Tian et al. | 307/65 |
| 2006/0220462 A1* | 10/2006 | O'Leary | 307/44 |
| 2006/0221523 A1* | 10/2006 | Colombi et al. | 361/90 |
| 2008/0265681 A1* | 10/2008 | Pfitzer et al. | 307/65 |
| 2008/0278003 A1* | 11/2008 | Pouchet et al. | 307/66 |
| 2008/0303347 A1* | 12/2008 | Zajkowski | 307/64 |
| 2009/0009001 A1* | 1/2009 | Marwali et al. | 307/65 |
| 2009/0033153 A1* | 2/2009 | Linkhart et al. | 307/64 |

* cited by examiner

REDUNDANT ISOLATION AND BYPASS OF CRITICAL POWER EQUIPMENT

CROSS-REFERENCE TO RELATED APPLICATIONS

This application claims the benefit of U.S. Provisional Application No. 60/953,882, filed Aug. 3, 2007, entitled "REDUNDANT ISOLATION AND BYPASS OF CRITICAL POWER EQUIPMENT," the entirety of which is hereby incorporated by reference.

BACKGROUND

1. Field

The subject invention relates to power delivery and in particular to systems and methods for providing a diverse source of power to a critical load in a power subsystem.

2. Related Art

Power distribution systems are typically used in facilities to convert transmitted high voltage energy to energy that is suitable for its intended use and deliver that energy within the facility. These facilities (e.g., hospitals, data centers, etc.) have a load (e.g., computers, heating and air conditioning equipment, etc.) to which the energy is delivered by the power distribution system. An exemplary power distribution system that is used in these facilities is a distributed redundant power system.

In a distributed redundant power distribution system, N+1 redundancy is achieved by providing two sources of power to a single load (e.g., servers and other IT equipment, chillers, etc.) from two diverse, totally independent sources. When there are only two such sources, there is only one combination (A+B). The system, therefore, has 2 N redundancy. When the system has three sources (A, B and C), there are three combinations of two: A and B, B and C and A and C. Similarly, when there are four sources (A, B, C, and D), there are six combinations of two: A and B, B and C, A and C, A and D, B and D an C and D. When there are five systems, there are ten combinations; and, when there are six systems, there are fifteen combinations.

Loading of the system using multiple sources can be as high as (1−1/N) times the total system capacity without overloading any system in the event of a single source failure. The criteria for achieving this maximum limit are that every possible combination of two systems needs to provide two-source power to an equal amount of load. For example, for five sources, there are ten load blocks, each of which needs to supply two source loads of 10% of the total load served. The total load can then be as high as 80% of the total system capacity.

For five 675 KW sources, for example, the total capacity is 3375 KW which would yield 2700 KW of distributed N+1 capacity as long as each of the ten combinations of two sources is loaded to 270 KW, split between the two sources such that when one source fails the load on the other source increases to no more than the sum of the load on both sources when both are energized. This configuration and loading would put a normal load of 540 KW on each source. Failure of any source causes the paired source in each of the four two-source combinations with that failed unit to assume half the 270 KW supplied by the two-source combination. This load assumption raises each of the four remaining sources from 540 KW to their maximum capacity of 675 KW.

The above system provides N+1 redundancy at all times that the five diverse sources are available. Maintenance activities, either planned or corrective, normally affect only a single source. However, any such maintenance results in the sources conceivably operating at 100% load. A single failure in the system while one source is out of service overloads all the other sources which can cause cascading service outages that could escalate to an entire system outage.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The invention is a system and method for consistently providing power throughout a facility without the risk of power interruption. The power is provided with a virtual level of redundancy by a specific external bypass circuit herein referred to as "generator bypass" that has a separate power source. It will be appreciated that although the specific external bypass is referred to as a generator bypass herein, the separate, redundant power source is not necessarily a generator. The external bypass circuit allows the normal power source for the facility to undergo routine maintenance or testing without affecting the ability of the power distribution system to provide power at any time and under any single failure scenario, without loss of redundancy. The generator bypass circuit can also be used in the event of failures in the power distribution system or in the event that components of the power distribution system need to be replaced, without affecting the redundancy of the power distribution system.

According to an aspect of the invention, a redundant power distribution system is provided that includes a normal operation circuit branch comprising an uninterruptible power supply (UPS) having a UPS input panel and a UPS output panel, the UPS configured to deliver power from a primary power source to a critical load; and a bypass circuit branch connected to the UPS input panel through a first connection and the UPS output panel through a second connection, the bypass circuit branch having a third connection to a redundant power source to deliver power to the critical load from the redundant power source.

The third connection may be a generator bypass line.

The bypass circuit branch may be connected to the critical load to deliver power to the critical load independent of the UPS and power distribution equipment at an input side of the UPS.

The critical load may be electrically isolated from the normal operation circuit when the redundant power source delivers power to the critical load.

The redundant power source may be a redundant generator or a redundant connection to a utility.

The bypass circuit may include a redundant UPS, the redundant UPS between the redundant power source and the critical load.

The system may also include a plurality of UPSs, the bypass circuit branch connected to an input panel and an output panel connected of each of the plurality of UPSs.

According to another aspect of the invention, a redundant power distribution system is provided that includes a connection to a utility power source; a primary generator; a redundant power source; a controller coupled with the connection to the utility power source and the primary generator; an uninterruptible power source (UPS) coupled with the controller and a load; a bypass circuit coupled with the controller and the load or the UPS, the redundant power source coupled with the bypass circuit; a UPS feeder breaker coupled with the controller, the UPS and the external bypass circuit; and a UPS output breaker coupled with the UPS and the load.

A supplemental bypass line may connect the redundant power source to the bypass circuit.

The supplemental bypass line may be a generator bypass line and the redundant power source may be a generator, the generator bypass line connecting the generator to the bypass circuit.

The redundant power source may include a redundant generator or a redundant connection to the utility power source.

The UPS may also include a rectifier and inverter coupled with the rectifier.

The UPS may also include a rectifier input and an internal bypass input, the rectifier input coupled with the rectifier and the internal bypass input coupled with the UPS bypass breaker, and the UPS feeder breaker may be coupled to the rectifier input, the internal bypass input, and an external bypass input, the external bypass input coupled with the external bypass circuit.

The system may also include a load bank connected to the UPS between the UPS and the UPS output breaker.

The load may include a plurality of servers and information technology (IT) equipment.

According to a further aspect of the invention, a system is provided that includes a plurality of UPS modules, each UPS module comprising a UPS input panel, a UPS connected to the UPS input panel, and a UPS output panel connected to the UPS, the plurality of UPS modules distributing power from a primary power source to a critical load; and a bypass circuit connected to the input panel and the output panel of each of the plurality of UPS modules, the bypass circuit comprising a redundant power source, the redundant power source distributing power from the redundant power source to the critical load when one of the UPS modules is out of service.

A supplemental bypass line may connect the redundant power source to the bypass circuit.

The supplemental bypass line may be a generator bypass line and the redundant power source may be a generator, the generator bypass line connecting the generator to the bypass circuit.

The critical load may be electrically isolated from the UPS module when the UPS module is out of service.

The primary power source may be one or more of a connection to utility and a generator.

The critical load may include a plurality of servers and information technology (IT) equipment.

The redundant power source may be one or more of a connection to utility and a generator.

According to another aspect of the invention, a system is provided that includes a normal operation circuit branch to deliver power from a first power source or a second power source to a critical load during normal operations, wherein the normal operation circuit comprises a first UPS having a first input panel and a first UPS output panel, a second UPS having a second UPS input panel and a second UPS output panel, and a controller connected to the first UPS input panel and the second UPS input panel; and a bypass circuit branch connected to the first UPS input panel, the first UPS output panel, the second UPS input panel, the second UPS output and the critical load, the bypass circuit branch to deliver power to the critical load from a redundant bypass power source during redundant source bypass operations, wherein the controller is to control whether the first UPS, the second UPS or the bypass circuit branch delivers power to the critical load.

A supplemental bypass line may connect the redundant power source to the bypass circuit branch.

The supplemental bypass line may be a generator bypass line and the redundant power source may be a generator, the generator bypass line connecting the generator to the bypass circuit.

The critical load may be electrically isolated from the normal operation circuit branch during generator bypass operations.

The redundant power source may include a redundant connection to utility and a redundant generator, and wherein the bypass circuit may include a UPS and a controller connected to the UPS, the utility and the generator connected to the controller.

The critical load may include a plurality of servers and information technology (IT) equipment.

According to a further aspect of the invention, a method is provided that includes energizing a bypass power source connected to an external bypass circuit; closing an uninterruptible power supply (UPS) input panel external bypass breaker; opening a bypass circuit breaker between the critical load and the bypass power source; and opening a breaker between a primary power source and the UPS input panel.

The method may also include performing maintenance on a controller connected to the UPS, a generator connected to the UPS and a connection to a utility connected to the UPS.

According to another aspect of the invention, a method is provided that includes energizing a bypass power source connected to a critical load through an external bypass circuit; opening an uninterruptible power supply (UPS) input panel external bypass breaker between an input of a UPS and an input of the external bypass circuit; closing a bypass circuit breaker between the critical load and the bypass power source; opening an output breaker between the UPS and the critical load; and de-energizing the UPS.

De-energizing the UPS may include de-energizing the input panel of the UPS.

The method may also include connecting a load bank to the UPS, re-energizing the UPS and testing one or more of the UPS, a controller connected to the UPS, a generator connected to the UPS and a connection to a utility connected to the UPS.

The method may also include performing maintenance on one or more of the UPS, a controller connected to the UPS, a generator connected to the UPS and a connection to a utility connected to the UPS.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
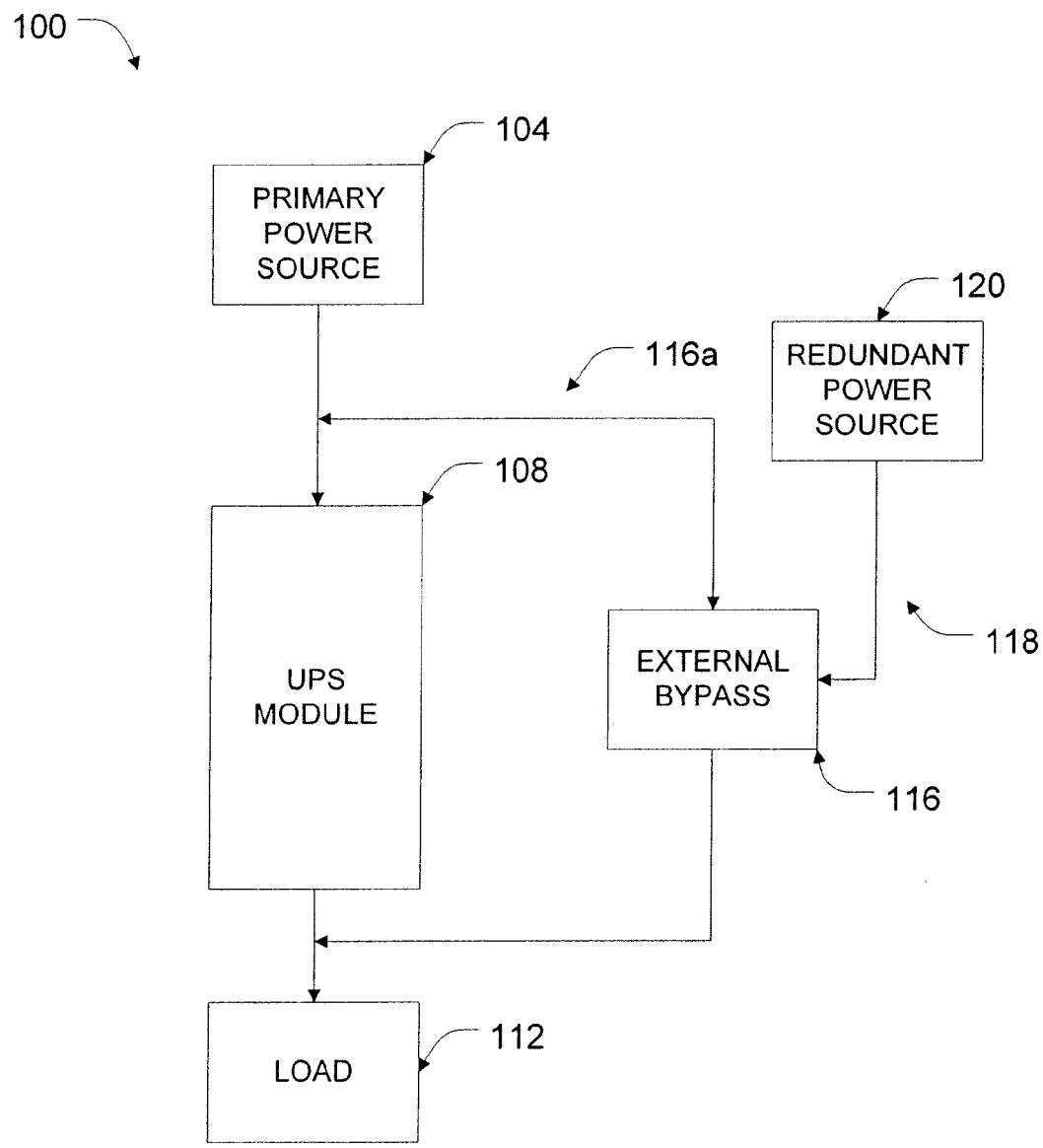
FIG. 1 is a block diagram of a power distribution in accordance with one embodiment of the invention.

An embodiment of the invention will now be described in detail with reference to FIG. 1. FIG. 1 illustrates a power distribution system that includes an external bypass circuit with generator bypass. The external bypass circuit is configured to provide a diverse source of power to a critical load when the normal power system needs to go out of service. The critical load can also be isolated from the normal power system when the normal power system goes out of service for maintenance.

FIG. 1 illustrates a power distribution system 100 that includes a primary power source 104, an uninterruptible power supply (UPS) module 108 and a load 112. A normal external bypass 116 connects the load 112 to the primary power source 104. The generator bypass 118 connects a redundant power source 120 to this external bypass 116. The normal external bypass 116 is thereby converted to a three way circuit with the addition of the generator bypass 118, which can connect the redundant power source 120 to the load 112, to the input of the UPS 108, or both at the same time.

In normal operations, power flows from the primary power source 104 through the UPS module 108 and to the load 112. The normal external bypass circuit bypasses the UPS by connecting the primary power source 104 directly to the load 112. Although the UPS module can be shut down for maintenance under these conditions, it cannot be fully function tested without also shutting down the critical load. However, during maintenance and/or testing using the generator bypass connection, the power flows from the redundant power source 120 to the load 112 through the lower half of the external bypass 116. In this embodiment, the redundant power source 120 is connected to the load 112 directly through the redundant bypass 116, and the UPS module 108 and primary power source 104 are electrically isolated from the load 112. This allows full functional testing of the UPS 108 without affecting the critical load 112. In another embodiment, the redundant power source 120 is connected to the UPS module 108 through the top half 116a of the external bypass 116, and the UPS module 108 is connected to the load 112. In this embodiment, the primary power source 104 can be electrically isolated from the UPS module 108 and shut down if desired.

Figure 2:
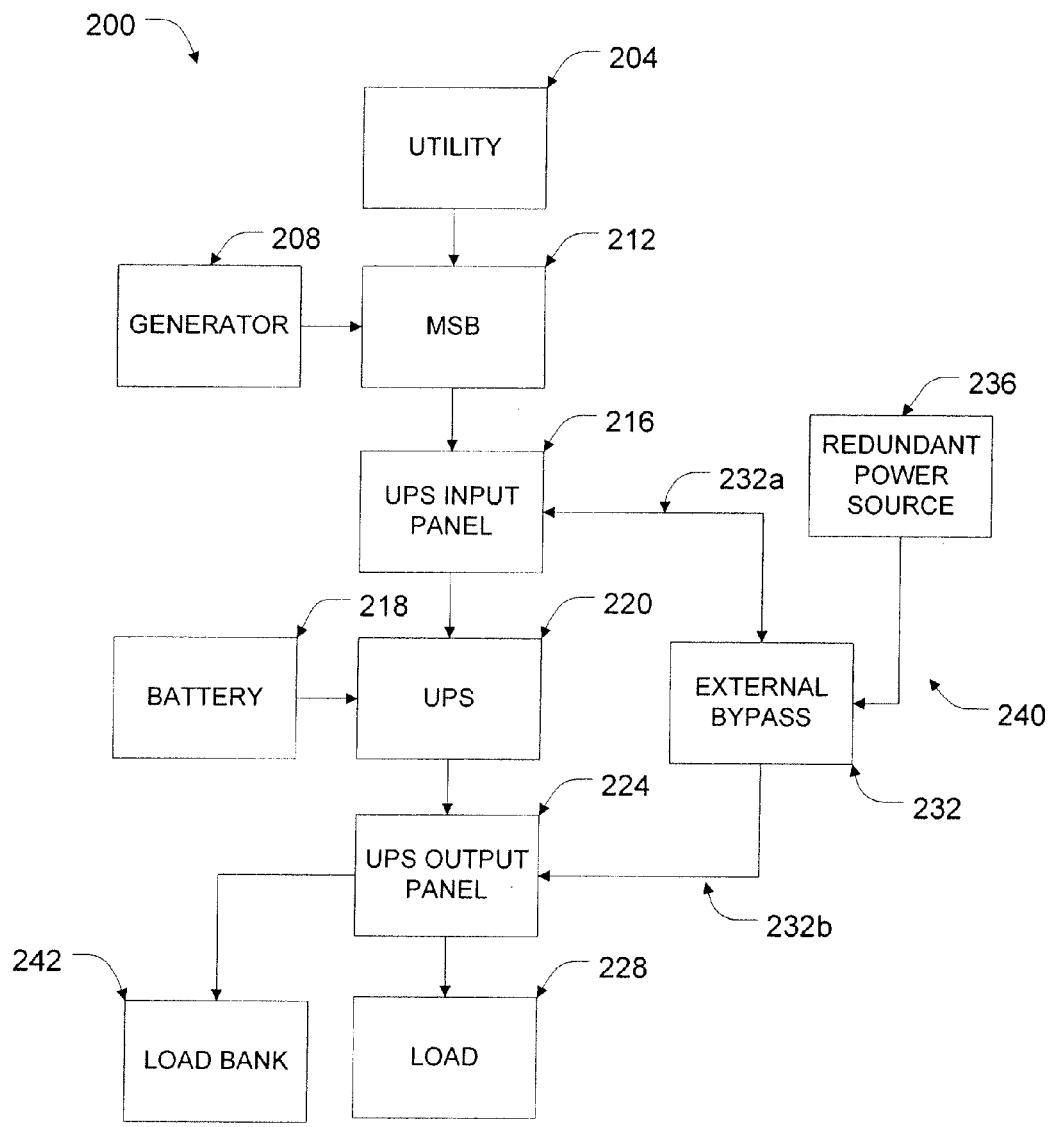
FIG. 2 is a block diagram of a power distribution system in accordance with one embodiment of the invention.

FIG. 2 illustrates a power distribution system 200 with more detail than the block diagram of FIG. 1. As shown in FIG. 2, the power distribution system 200 includes a connection to utility 204, generator 208, main switch board (MSB) 212, uninterruptible power supply (UPS) input panel 216, battery 218, UPS 220, UPS output panel 224, load 228, external redundant bypass 232, redundant power source 236, generator bypass line 240 and load bank 242. The connection to utility 204 or generator 208 provides normal and standby emergency power respectively to the load 228 through the UPS 220. The utility 204 and generator 208 are connected to the MSB 212, which is configured to control delivery of the power from the utility 204 or generator 208, depending on status of the utility 204. The MSB 212 is connected to the UPS input panel 216, which is connected to the UPS 220. The UPS 220 is configured to convert the Alternating Current (AC) power from the MSB 212 into Direct Current (DC) power that keeps the battery charged and supplies power through an inverter stage to re-create Alternating Current (AC) that can be used by the load 228. For example, the UPS 220 may convert the power from the utility 204 from, for example, 480 VAC to 500 VDC for the battery 218, then back to 480 VAC. The battery keeps the UPS 220 inverter stage running for a period of time when the input panel 216 is de-energized, such as during a utility outage while the generator 208 starts up, or during any other type of transfer of power source, such as to the redundant power source 236. The converted power from the UPS 220 is distributed to the load 228 through the UPS output panel 224.

In normal operations, power flows from the utility 204 through the UPS 220 to the load 228. During utility outage operations, power flows from the generator 208 through the UPS 220 to the load 228.

An external bypass 232 is shown connected to the power distribution system at the UPS output panel 224 and at the UPS input panel 216. The external redundant bypass 232 includes a redundant power source 236 connected to the external bypass circuit 232 by the generator bypass line 240. It will be appreciated that although the specific external bypass is referred to as a generator bypass herein, the separate, redundant power source is not necessarily a generator. The redundant power source 236 is a redundant connection to utility, a redundant generator or both a redundant connection to utility and redundant generator. The external bypass redundant source 236, optionally, includes a redundant MSB, redundant UPS, or combinations thereof (not shown).

During maintenance and/or testing, the power flows from the redundant power source 236 to the load 228 through the generator bypass 240 and the lower half 232b of the normal external bypass 232. In this mode of operation, the redundant power source 236 is connected to the load 228 directly through the redundant bypass 232, while the UPS 220 and the upstream distribution equipment (e.g., MSB 212, generator 208, connection to utility 204, etc.) are electrically isolated from the load 228 and can be shut down if desired. In this configuration, the UPS 220 can be connected to a load bank 242 for load testing, while the critical load 228 is still connected to the redundant power source 236. In another mode of operation, the redundant power source 236 is connected to the UPS 220 through the generator bypass 240 and the top half 232a of the external bypass 232, and the UPS 220 is connected to the load 228. In this configuration, the upstream distribution equipment (e.g., MSB 212, generator 208, connection to utility 204, etc.) is electrically isolated from the UPS 220 and can be shut down if desired.

Figure 3:
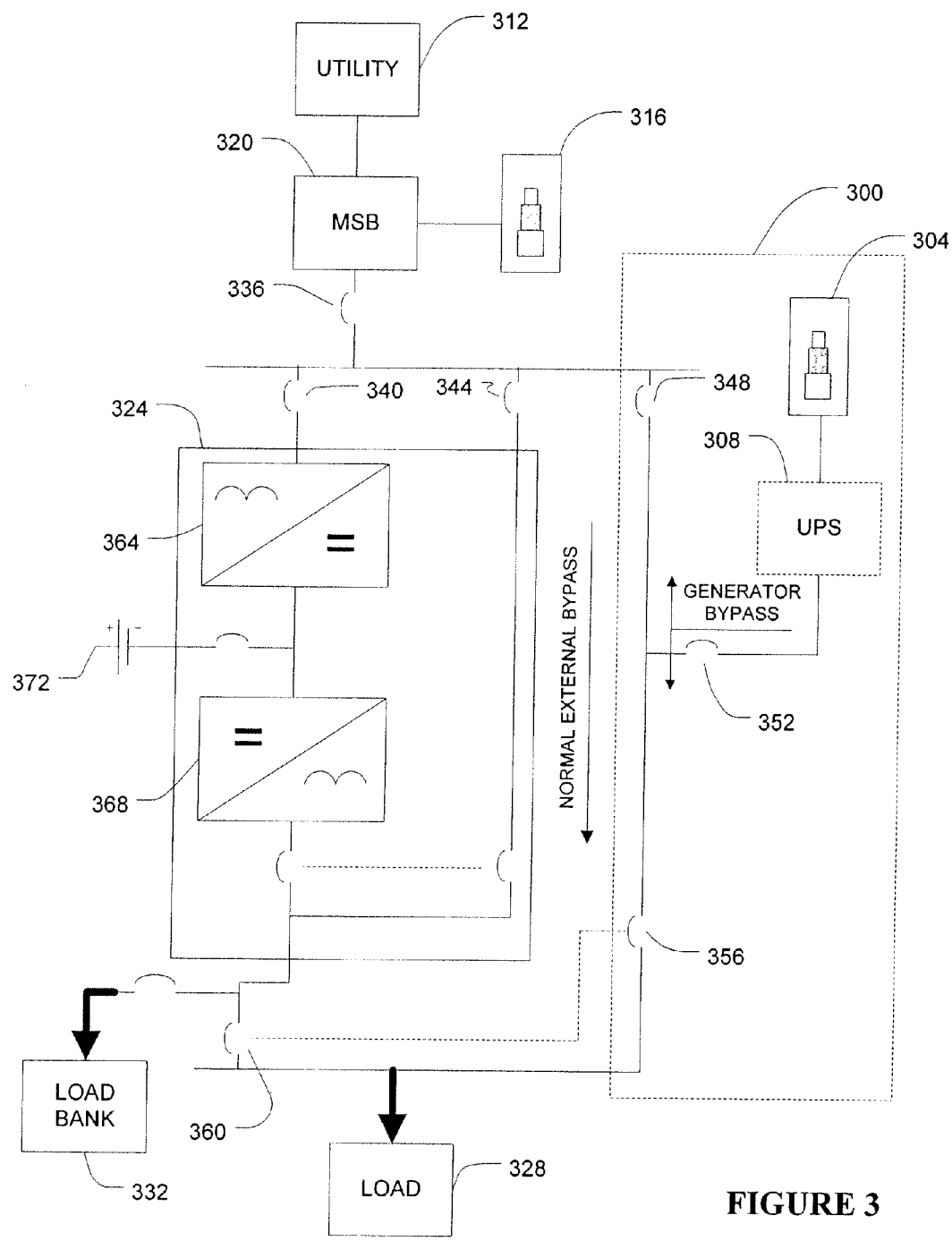
FIG. 3 is a circuit diagram showing a normal external bypass circuit with a generator bypass connection in accordance with one embodiment of the invention.

FIG. 3 illustrates a power distribution system one line diagram that includes an external bypass circuit 300, enhanced with the generator bypass feature. The external bypass circuit 300 includes a redundant generator 304 and, optionally, a redundant UPS 308. The external bypass circuit 300 may include other features including a redundant MSB (not shown), a redundant connection to utility (not shown), additional circuit breakers (not shown) and the like.

The power distribution system also includes a connection to utility 312 and a generator 316 connected to a MSB 320. The MSB 320 is connected to a UPS 324, which is connected to a load 328 and a load bank 332. Each UPS is connected to the supply side power distribution via an MSB branch circuit breaker 336, and an input panel that has three circuit breakers: a UPS rectifier input circuit breaker 340, a UPS internal bypass circuit breaker 344 and an external bypass circuit breaker 348. The UPS rectifier input circuit breaker 340 and the UPS internal bypass circuit breaker 344 are connected to the UPS 324, and the external bypass circuit breaker 348 is connected to the external bypass circuit 300.

The external bypass circuit 300 also includes a first circuit breaker 352 and a second circuit breaker 356. The normal external bypass line is made up of circuit breakers 348 and 356, which when closed "bypass" the UPS. The circuit breaker 352 connects the generator bypass line to the external bypass circuit and is positioned between the two normal external bypass breakers 348 and 356. It will be appreciated that although the specific external bypass is referred to as a generator bypass herein, the separate, redundant power source is not necessarily a generator.

The power distribution system also includes a UPS output panel that includes a UPS output circuit breaker 360, the external bypass breaker 356, and all of the branch breakers (not shown) that supply power to one side of multiple two-source critical loads. It will be appreciated that the external bypass circuit enhanced with the generator bypass redundant source can be used with equal effectiveness on UPS systems that supply loads exclusively as a single source, rather than as one source in a dual source configuration. The UPS output circuit breaker 360 is positioned between the UPS 324 and the load 328. The UPS output circuit breaker 360 is also connected to the second circuit breaker 356 of the external bypass circuit 300 such that when the second circuit breaker 356 is closed, the UPS output circuit breaker 360 is opened, and vice versa. The UPS output circuit breaker 360 is configured to allow the use of the external bypass circuit 300 to serve the load 328, while electrically isolating the UPS 324. In particular, the UPS output circuit breaker 360 isolates the UPS 324 from the output panel of the UPS 324.

The UPS 324 includes a rectifier 364, an inverter 368 and a wet cell battery 372. It will be appreciated that UPS systems utilizing other DC storage equipment, such as gel-cell batteries, nickel-cadmium batteries, flywheels, etc. are equally able to employ the external bypass circuit with enhanced generator bypass redundant source. Power is supplied to the UPS through the MSB 320 and the UPS rectifier input circuit breaker 340 or the UPS internal bypass circuit breaker 344. The UPS rectifier input circuit breaker 340 feeds power to the rectifier 364, which converts the power from the primary power source (e.g., utility 312) into DC power. The converted DC power is fed to the inverter 368, which produces three phase output voltage which is used by the critical load 328. The wet cell battery 372 is provided between the rectifier 364 and the inverter 368, and can provide DC power directly to the inverter 368 in the event of a power interruption.

The internal bypass circuit breaker 344 provides a second power input to the UPS 324, allowing the output of the UPS 324 to be connected directly to the input of the UPS 324, bypassing the rectifier 364 and the inverter 368. Internal controls automatically trigger this transfer scheme if the rectifier 364 or inverter 368 fails and power is available on the internal bypass input. This internal UPS bypass configuration is also provided in prior art power distribution systems; however, when the internal UPS bypass configuration alone is provided, the system suffers from several drawbacks including a loss of redundancy when a source fails. In addition, neither the MSB nor the UPS can be tested or undergo maintenance without losing redundancy.

Site specific program code operating in one or more programmable logic controllers (PLCs) manage the interlocking and switching requirements to allow multiple modes of operation of the UPS. The PLCs include information regarding the automatic and operator assisted switching that occurs to change the UPS from its normal operating mode to another operating mode, as described below. It will be appreciated that systems using other forms of control than PLC's, or with only manually operated equipment are equally able to employ the external bypass circuit with enhanced generator bypass redundant source.

When the utility 312 is connected, the power feeder breaker 336 and the rectifier input circuit breaker 340 are closed, and the UPS 324 is energized, with power flow through circuit breaker 340, the UPS 324 is operating in its normal mode. When the utility 312 is not connected, or is lost due to any external cause of failure, the generator 316 is energized, the power feeder breaker 336 and the rectifier input circuit breaker 340 are closed, and the UPS 324 is energized, with power flow through circuit breaker 340, the UPS 324 is operating in its backup mode. When the utility 312 or generator 316 are connected, the power feeder breaker 336 and the UPS internal bypass breaker 344 closed, with power flow through circuit breaker 344, and the UPS 324 is energized, the UPS 324 is operating in its internal bypass mode. In the internal bypass mode, power is supplied directly from the utility 312 or generator 316 to the load 328, bypassing the rectifier and inverter.

When the redundant generator 304 is energized, the first circuit breaker 352 is closed, external bypass circuit breaker 348 is closed, and the power feeder circuit breaker 336 is open, the UPS 324 can remain in service while the primary upstream distribution equipment (e.g., MSB 320, generator 316, connection to utility 312) is de-energized. This mode of UPS operation is called generator bypass. In this configuration, maintenance can be performed on the upstream distribution equipment, independent of UPS operation.

When the redundant generator 304 is energized, the first circuit breaker 352 is closed, the external bypass circuit breaker 348 is open, the second breaker 356 is closed, and the UPS output circuit breaker 360 is open, the critical load 328 remains energized through generator 304 while the entire UPS 324 can be de-energized (including the input panel). Thus, power from the generator 304 flows directly to the load 328 without going through the isolated UPS 324. This mode of operation is called output panel in generator bypass, and allows the UPS 324 to be completely out of service, while the load 328 is supplied by redundant generator 304 or the redundant UPS 308 (if used). In other configurations (not shown) the generator bypass line can be supplied from any number of other generators, MSB's, or UPS systems. In this configuration, the UPS 324, MSB 320 and/or generator 316 can undergo routine maintenance, either energized or de-energized.

When the primary UPS 324 is reenergized via circuit breaker 336, and connected to the load bank 332, load testing can be performed on the UPS 324 and the upstream distribution equipment. In this configuration, when the UPS 324 is connected to the load bank 332, the critical load 328 is not affected because the connection of the redundant generator 304 to the critical load 328, via the generator bypass line, is independent of the primary power distribution to the UPS 324. This mode of operation is called UPS load-banking.

Figure 4:
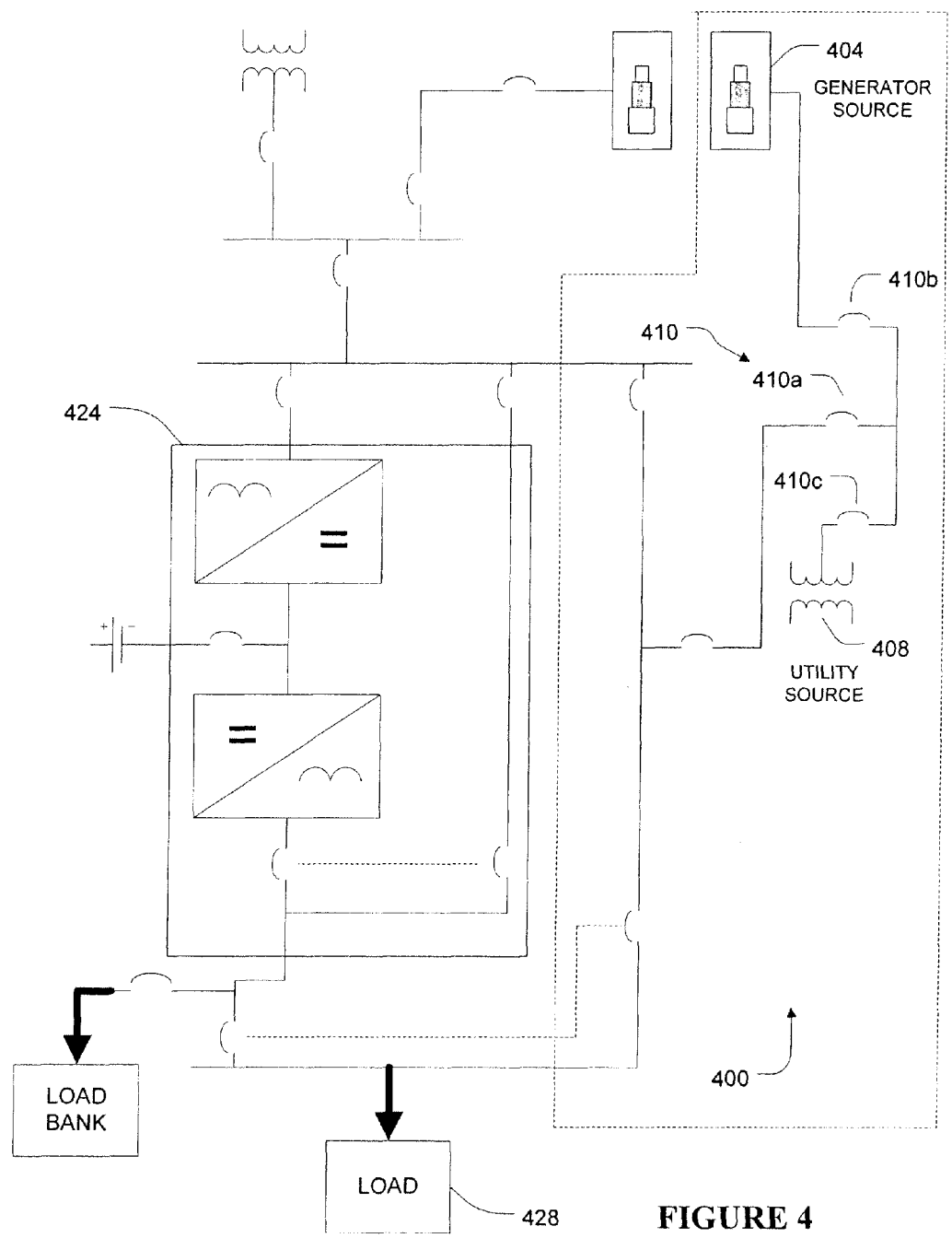
FIG. 4 is a circuit diagram showing the generator bypass circuit with a utility source option in accordance with one embodiment of the invention.

FIG. 4 illustrates an external bypass circuit 400 with connections to both a redundant generator 404 and a redundant connection to utility 408. The external bypass circuit 400 is connected to a UPS 424 and load 428 as described above with reference to FIG. 3. The external bypass circuit 400 allows the load 428 to be powered by either the redundant connection to utility 408 or the redundant generator 408 through the generator bypass line, while electrically isolating the UPS 424. The external bypass circuit 400 also allows the upstream distribution equipment to be electrically isolated by connecting the redundant generator 404 or redundant connection to utility 408 to the UPS 424, which is connected to the load 428.

FIG. 3 and FIG. 4 differ in that the external bypass circuit 400 includes both the redundant generator 404 and the redundant connection to utility 408, with a switch 410 therebetween. The switch 410 includes three circuit breakers: a first circuit breaker 410a for connection of the generator bypass line to the redundant power sources, a second circuit breaker 410b associated with the redundant generator 404 and a third circuit breaker 410c associated with the redundant connection to utility 408. The circuit breakers 410a-410c are opened and closed depending on the desired source. It will be appreciated that the external bypass circuit 400 may include either a redundant generator 404 or a redundant connection to utility 408, as opposed to both the redundant generator 404 and redundant connection to utility 408. In such a configuration, the switch 410 is not required.

FIG. 3 and FIG. 4 also differ in that the external bypass circuit 400 does not include a redundant UPS. It will be appreciated that the external bypass circuit 400 may, however, include a redundant UPS and/or a redundant MSB (not shown).

Figure 5:
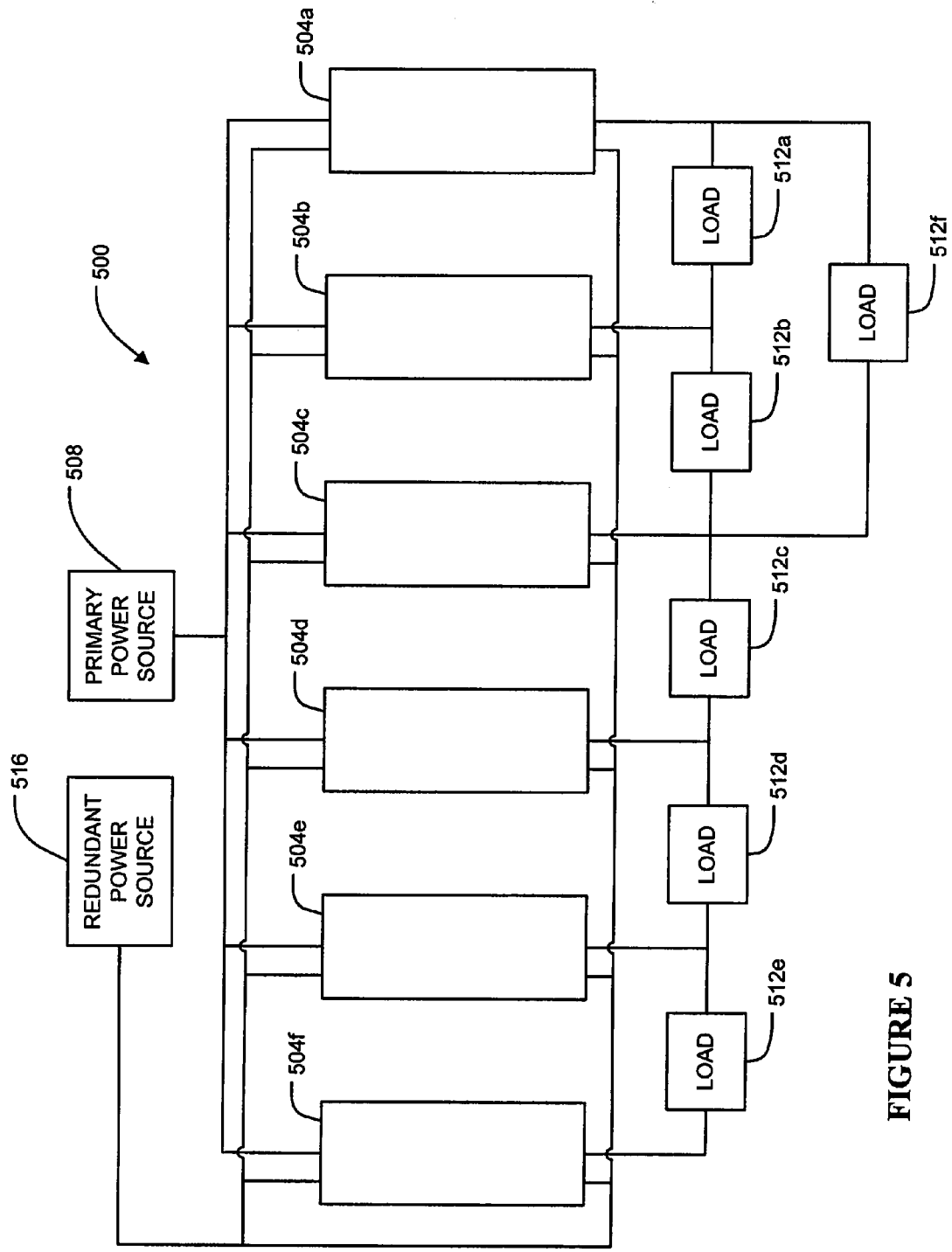
FIG. 5 is a block diagram of a power distribution system in accordance with one embodiment of the invention.

FIG. 5 illustrates the external redundant power connection in a power distribution system having multiple UPS modules. In FIG. 5, the power distribution system 500 is shown having a first UPS module 504a, a second UPS module 504b, a third UPS module 504c, a fourth UPS module 504d, a fifth UPS module 504e and a sixth UPS module 504f. It will be appreciated that the number of UPS modules 504 may vary from that illustrated.

Each of the UPS modules (collectively, 504) are connected to a primary power source 508 and a load (collectively 512). The primary power source 508 is a connection to utility or a backup generator, depending on utility status. Each UPS module is connected to the supply side power distribution via an input panel that has three circuit breakers: rectifier input, internal bypass input and external bypass (not shown); each UPS module is connected to the load side distribution via an output panel that has a UPS module output breaker and external bypass breaker, and all of the branch breakers that supply power to one side of multiple two-source critical loads (not shown). Each UPS module is connected to the power source 508 via a MSB, which is controlled by its own dedicated PLC (not shown). Each of the MSB PLC's communicate with one another to share information about generator failures and load bank testing with a PLC (not shown) associated with a redundant power source 516 that is also connected to each of the UPS modules 504, as described above with reference to FIGS. 1-4. It will be appreciated that systems using other forms of control than PLC's, or with only manually operated equipment are equally able to employ the external bypass circuit with enhanced generator bypass redundant source. With six UPS modules as shown in FIG. 5, there are 15 combinations of two sources to serve dual source loads. Six of those 15 combinations are represented as loads 512a through 512f, showing the dual source combinations of 504a/504b, 504b/504c, 504c/504d, 504d/504e, 504e/504f, and 504a/504c respectively. It will be appreciated that there would be 9 other combinations not shown on FIG. 5: 504a/504d, 504a/504e, 504a/504f, 504b/504d, 504b/504e, 504b/504f, 504c/504e, 504c/504f, and 504d/504f. It will be appreciated that the external bypass circuit enhanced with the generator bypass redundant source can be used with equal effectiveness on UPS systems that supply loads exclusively as a single source, rather than as one source in a dual source configuration.

In the event that any of the UPS modules 504 need to be out of service for replacement, maintenance or testing or in the event that any of the UPS modules 504 fail, the external redundant power system 516 can be used to maintain redundancy in the power distribution system 500, by supplying power to that UPS module's loads through the generator bypass system connection to that UPS module's external bypass circuit. In addition, the loads on that UPS (512) can be electrically isolated from the UPS module 504 during the replacement, maintenance, testing or failure.

Figure 6:
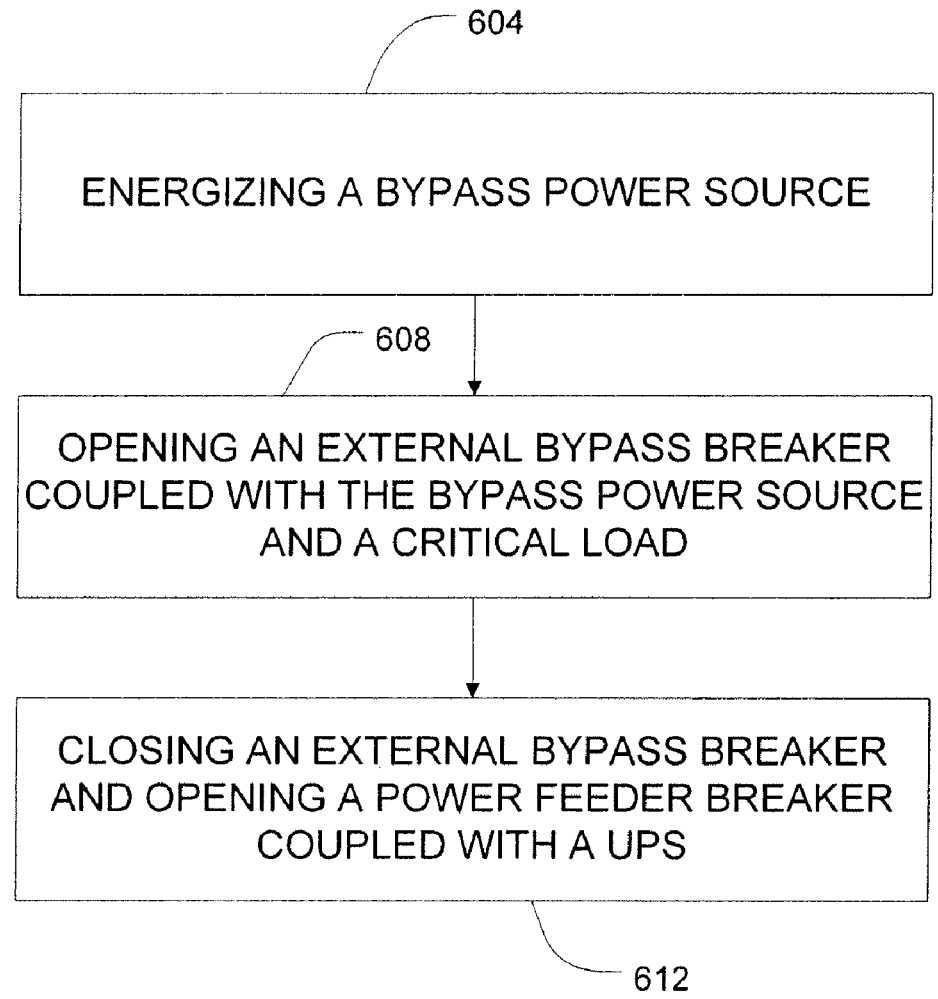
FIG. 6 is a flow diagram of a method for power delivery in accordance with one embodiment of the invention.
Figure 6A:
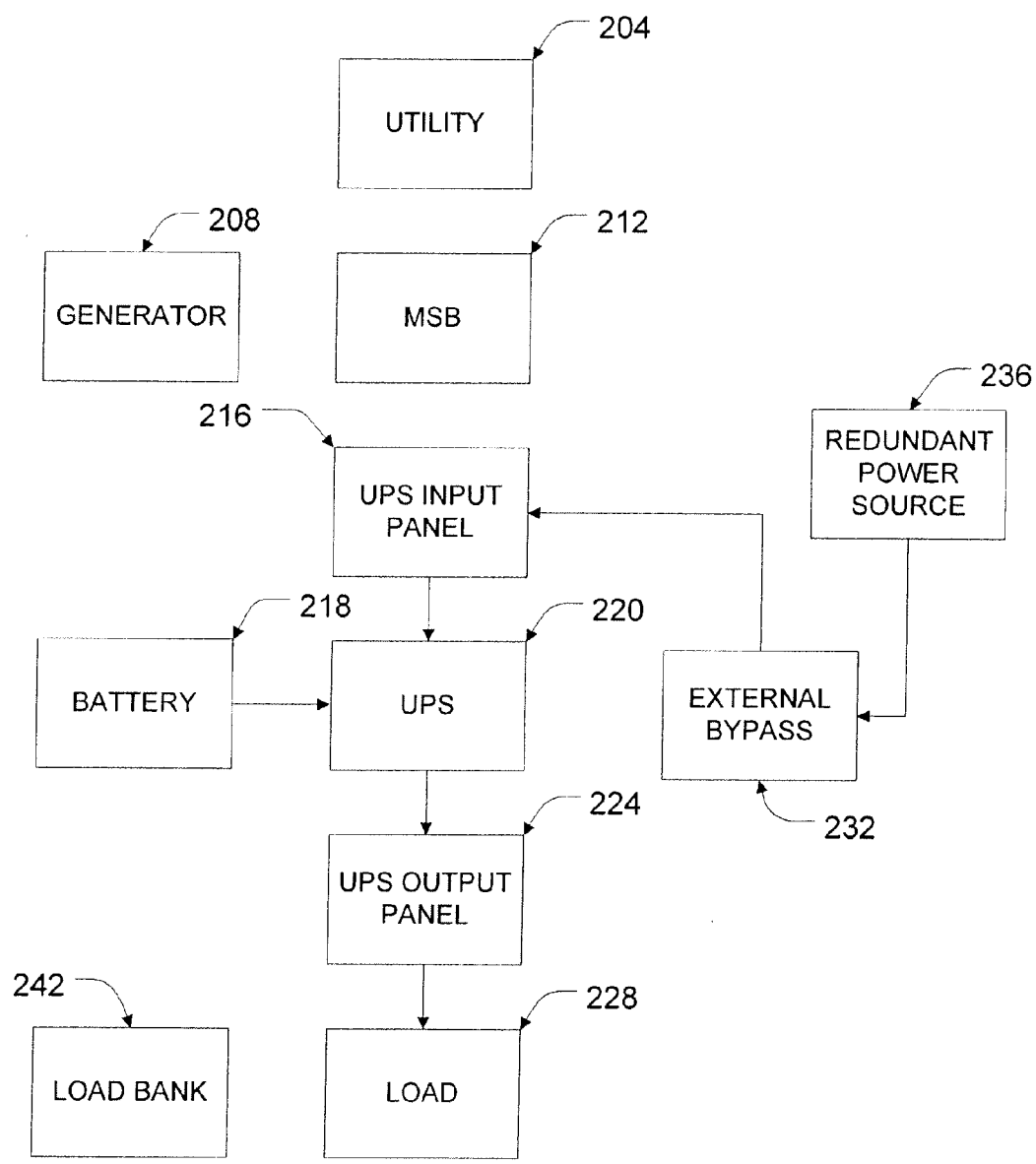
FIG. 6A is a block diagram illustrating the method of FIG. 6 in accordance with one embodiment of the invention.

FIG. 6 illustrates a process for power distribution 600, referred to as UPS generator bypass operation above. It will be appreciated that the steps of the process 600 described below may have a different order. In addition, it will be appreciated that the process 600 may include fewer steps or additional steps. FIG. 6A illustrates the process of FIG. 6 in relation to the block diagram of FIG. 2.

The process 600 begins by energizing a bypass power source (block 604). For example, the redundant power source 236 of the external bypass 232 can be energized.

The process 600 continues by opening an external bypass breaker coupled with the bypass power source (block 608), and closing an external bypass breaker and opening a power feeder breaker coupled with a UPS (block 612). Thus, as shown in FIG. 6A, the load 228 is connected to the UPS 220 which is powered by the redundant power source 236. As a result, the upstream distribution equipment (e.g., MSB 212, generator 208, connection to utility 212, etc.) can undergo routine maintenance, testing, or replacement. In addition, this configuration allows the UPS 220 to be powered by the generator 236 in the event of a failure at the utility 204 and generator 208. It will be appreciated that after maintenance, testing, replacement or failure, the process 600 may continue by reconnecting the upstream distribution equipment and disconnecting the external bypass 232.

Figure 7:
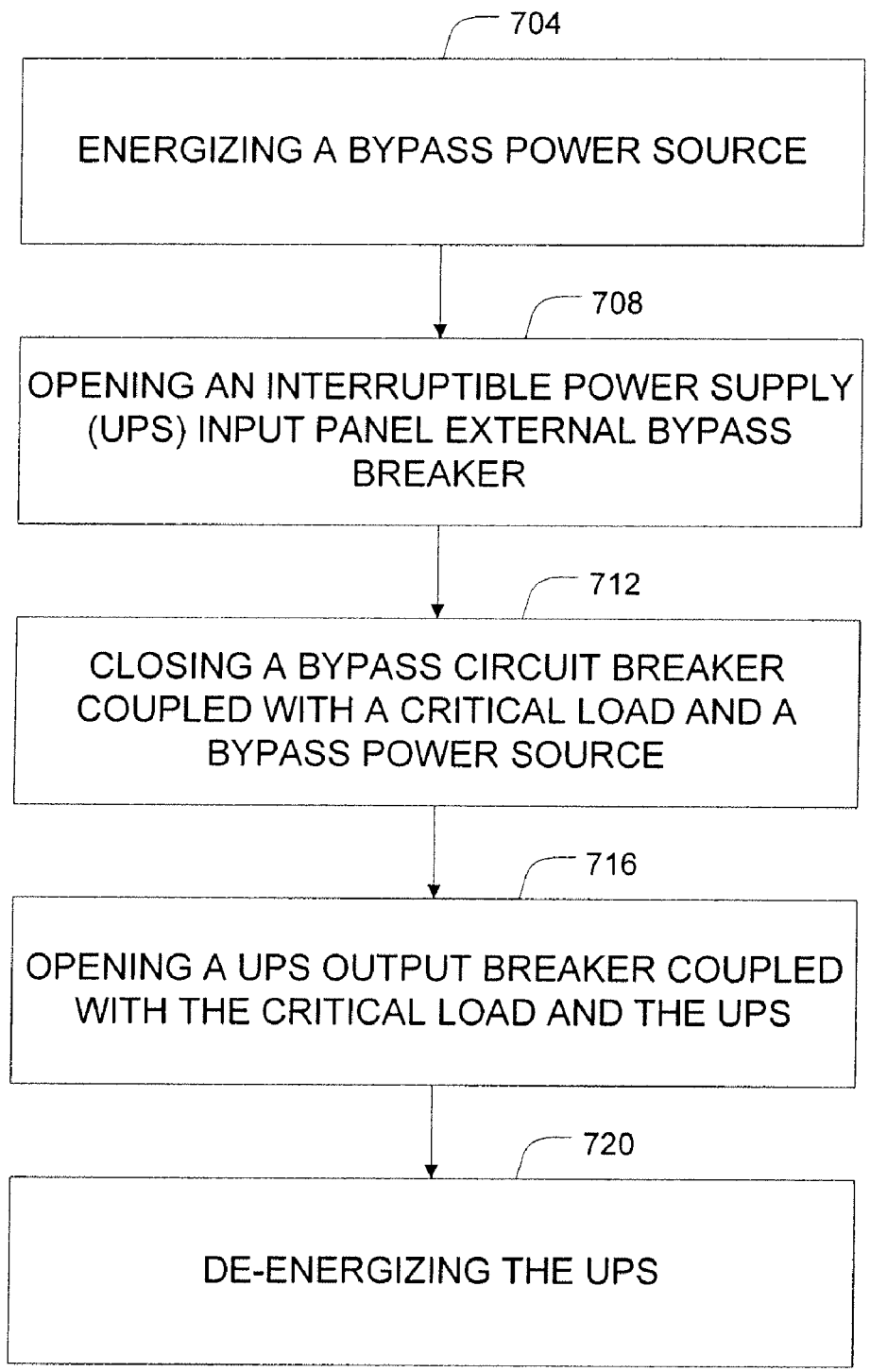
FIG. 7 is a flow diagram of a method for power delivery in accordance with one embodiment of the invention.
Figure 7A:
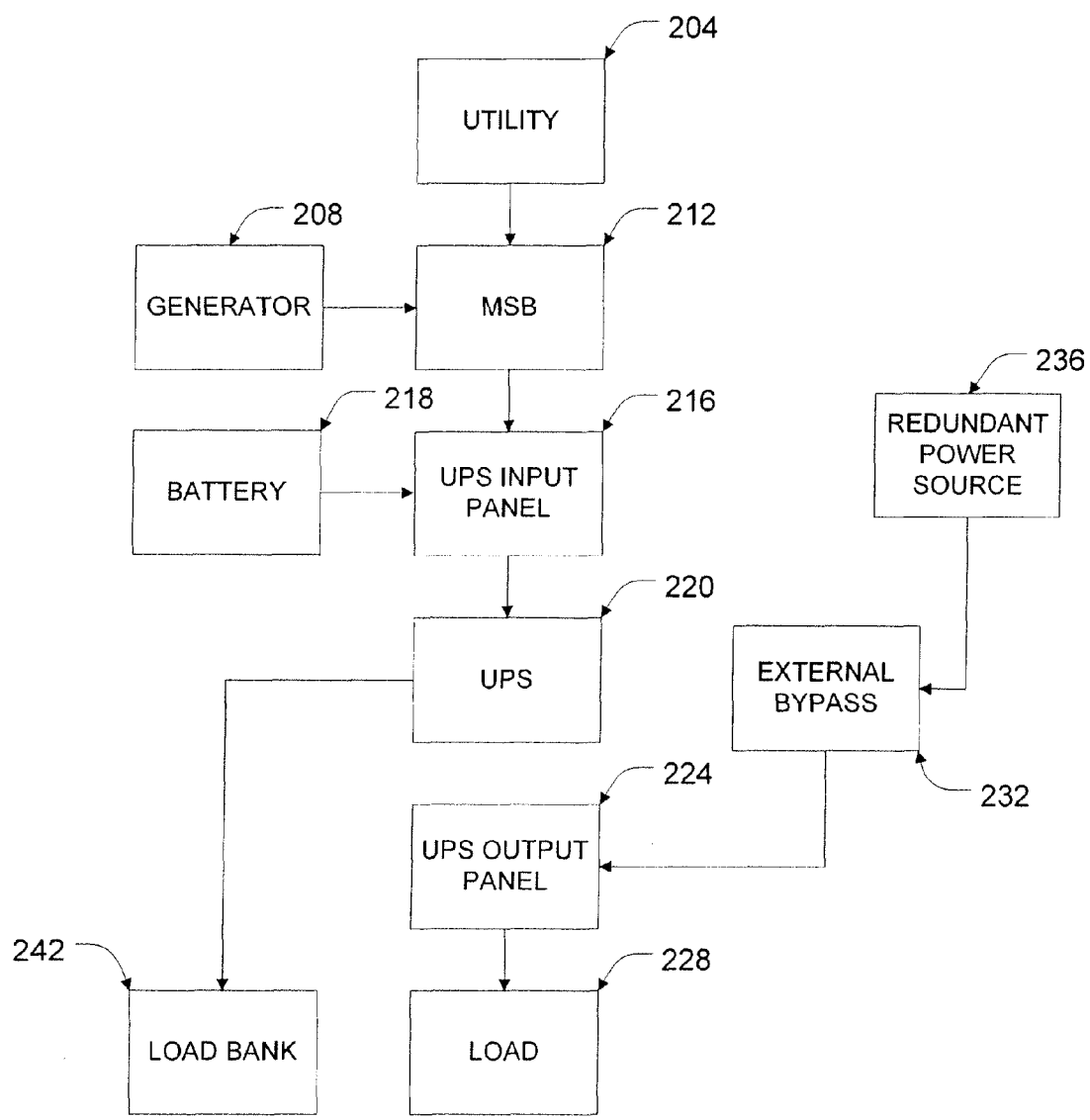
FIG. 7A is a block diagram illustrating the method of FIG. 7 in accordance with one embodiment of the invention.

FIG. 7 illustrates a process for redundant isolation 700. The process for redundant isolation 700 may be the same as the UPS output panel generator bypass operation described above. It will be appreciated that the steps of the process 700 described below may have a different order. In addition, it will be appreciated that the process 700 may include fewer steps or additional steps. FIG. 7A illustrates the process of FIG. 7 in relation to the block diagram of FIG. 2.

The process 700 begins by energizing a bypass power generator (block 704). The process 700 continues by opening a UPS input panel external bypass breaker (block 708). The process 700 continues by closing a bypass circuit breaker coupled with a critical load and a bypass generator (block 712). The process 700 continues by opening a UPS output circuit breaker between the UPS and the critical load (block 716). The process 700 continues by deenergizing the UPS (block 720). For example, as shown in FIG. 7A, the redundant power source 236 is connected directly to the load 228 through the generator bypass line to the external bypass 232.

In one embodiment, the process 700 continues by connecting a load bank to the UPS after the UPS is isolated and the UPS reenergized to perform testing (not shown), referred to as UPS load-banking operations above. For example, as shown in FIG. 7A, the load bank 242 is connected to the UPS 220, which is connected to the utility 204 or generator 208.

After the UPS is isolated from the critical load and the bypass power generator is directly connected to the critical load, the UPS or upstream power distribution equipment (e.g., MSB, generator, connection to utility, etc.) can undergo maintenance or testing. It will be appreciated that switching to the bypass source can also be used in the event of a failure of a UPS or upstream distribution equipment or for replacement of the UPS or upstream distribution equipment. After maintenance, testing, replacement or failure, the process 700 may continue by switching back to the primary source from the bypass source by performing the opposite of the steps described in FIG. 7 (e.g., closing vs. opening, energizing vs. de-energizing).

The above described systems and processes provide a diverse source of power to critical load in order to allow a UPS or other critical power system element to be taken out of service without reducing N+1 redundancy. In these systems, automatic and/or manually assisted switching allows the systems to enter the generator bypass modes and return to normal, without power interruption. This diverse source of power allows implementation of a scheduled preventative maintenance program without compromising the redundancy level of the distribution system. A well-maintained system is less likely to fail in service. The systems and methods described herein provide operational flexibility to perform maintenance and/or system upgrades without reducing the level of redundancy of the system. Thus, the systems and methods effectively provide virtual N+2 (VN2) redundancy, also called "fix one, break one" redundancy.

Figure 8:
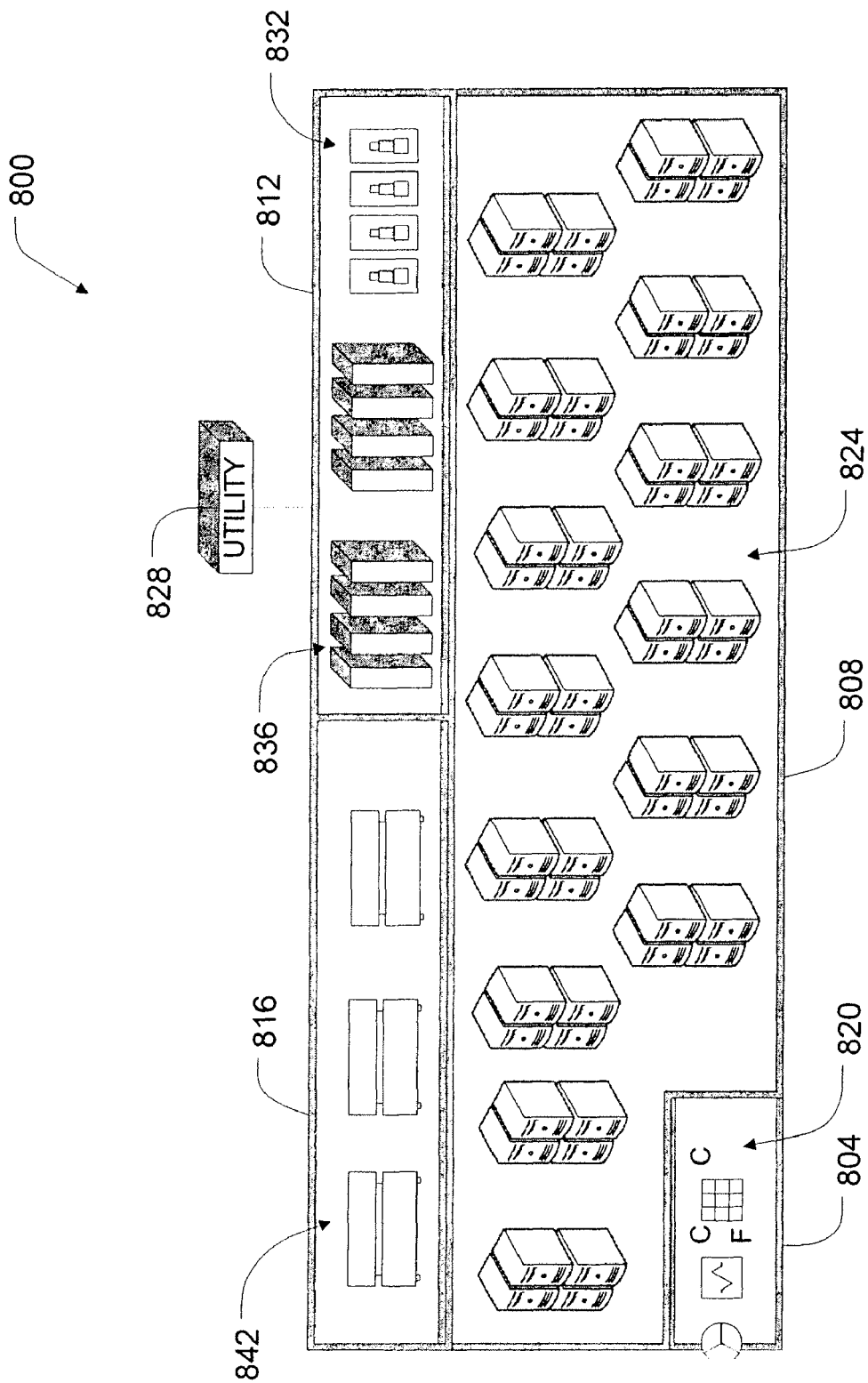
FIG. 8 is a schematic view of a data center in accordance with one embodiment of the invention.

An exemplary facility that may include the redundant isolation power distribution system as described above is a data center, such as the data center shown in FIG. 8. Data centers have become increasingly popular for storing and/or processing electronic data. Data centers typically include hundreds or even thousands of server computers capable of handling data for the data center's customers, requiring an elaborate power distribution system to consistently handle powering and cooling the server computers and other information technology (IT) equipment.

The illustrated data center 800 includes a secure entrance 804, a load room 808, a power distribution room 812 and a mechanical room 816. The secure entrance 804 includes security features 820 to control access of individuals into the load room 808. The security features 820 may include, for example, on-site security, surveillance cameras, proximity cards, pin pads, biometric iris scanners, mantrap portals, revolving doors, etc, and combinations thereof. The load room 808 includes a plurality of servers and other IT equipment 824 to store and process data as required by customers of the data center and/or operators of the data center. It will be appreciated that the number of server computers and other IT equipment depends on the requirements of the data center's customers and that additional components may be included in the load room.

The power distribution room 812 includes a connection to a utility 828, generators 832 and power distribution equipment 836. The utility 828 is the primary source of power to the power distribution equipment 836. The power distribution equipment 836 may include, for example, MSBs, UPSs, transformers, circuit breakers, etc. In addition, the power distribution equipment 836 may include the above-described external bypass circuit enhanced with the generator bypass feature. The power distribution equipment 836 is configured to distribute power from the utility 828 and/or generator 832 to the servers and other IT equipment 824 in the load room 808.

The mechanical room 816 includes mechanical equipment to control the temperature of the load room 808. The mechanical equipment may include chillers 842 and plumbing connecting the chillers 842 to the load room 808. It will be appreciated that the mechanical room 816 may include other types of mechanical equipment for cooling the load room 808, including cooling towers and pumps installed exterior to the building, and that the power distribution equipment 836 powers at least the servers and other IT equipment 824, chillers 842, etc.

By modifying the power distribution system of the data center 800 to include the external bypass circuit enhanced with generator bypass described above with reference to FIGS. 1-7, the risk of power interruption to the server computers and other IT equipment and mechanical equipment can be significantly reduced, even during replacement, maintenance, testing or failure.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

The present invention has been described in relation to particular examples, which are intended in all respects to be illustrative rather than restrictive. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A redundant power distribution system comprising:
a normal operation circuit branch comprising an uninterruptible power supply (UPS), wherein the UPS comprises a UPS input panel, a UPS output panel, and an inverter, a rectifier and an internal bypass circuit between the UPS input panel and the UPS output panel, the UPS configured to deliver power from a primary power source to a critical load; and
a bypass circuit branch external to the UPS and connected to the UPS at both the UPS input panel and the UPS output panel, the bypass circuit branch connected to a redundant power source by a redundant power line in electrical communication with the bypass circuit branch, the redundant power source being different than the primary power source, wherein the redundant power source delivers power to the critical load through the UPS input panel or through the UPS output panel.

2. The system of claim 1, wherein the bypass circuit branch is connected to the redundant power source through a generator bypass line.

3. The system of claim 1, wherein the critical load is electrically isolated from the normal operation circuit when the redundant power source delivers power to the critical load.

4. The system of claim 1, wherein the redundant power source is a redundant generator or a redundant connection to a utility.

5. The system of claim 1, further comprising a redundant UPS connected to the bypass circuit branch through the redundant power line, the redundant UPS between the redundant power source and the critical load.

6. The system of claim 1, wherein the UPS comprises a housing and wherein the housing comprises the UPS input panel and the UPS output panel.

7. A redundant power distribution system comprising:
a connection to a utility power source;
a primary generator;
a redundant power source different than the primary generator and different than the connection to the utility power source;
a controller coupled with the connection to the utility power source and the primary generator;
an uninterruptible power source (UPS) coupled with the controller, the UPS comprising an input panel and an output panel, an inverter, a rectifier and an internal bypass circuit, the output panel coupled with a load, the primary generator and the connection to the utility power source coupled with the input panel of the UPS;
a bypass circuit external to the UPS and coupled with the controller, the bypass circuit coupled with the input panel of the UPS and coupled with the output panel of the UPS, the redundant power source coupled with the bypass circuit via a supplemental bypass line;
a UPS feeder breaker located at the UPS input panel, the UPS feeder breaker coupled with the controller and the bypass circuit to selectively deliver power to the UPS from the redundant power source through the bypass circuit via the UPS input panel; and
a UPS output breaker located at the UPS output panel, the UPS output breaker coupled to the controller and the bypass circuit to selectively deliver power to the load from the bypass circuit via the UPS output panel.

8. The system of claim 7, wherein the supplemental bypass line is a generator bypass line and wherein the redundant power source is a generator, the generator bypass line connecting the generator to the bypass circuit.

9. The system of claim 7, wherein the redundant power source comprises a redundant generator or a redundant connection to the utility power source.

10. The system of claim 7, wherein the UPS further comprises a rectifier input and an internal bypass input, the rectifier input coupled with the rectifier and the internal bypass input coupled with a UPS bypass breaker and the internal bypass circuit, and wherein the UPS further comprises a UPS rectifier breaker coupled to the rectifier input, the internal bypass input, and an external bypass input, the external bypass input coupled with the external bypass circuit.

11. The system of claim 7, further comprising a load bank connected to the UPS between the UPS and the UPS output breaker.

12. The system of claim 7, wherein the UPS comprises a housing and wherein the housing comprises the UPS input panel and the UPS output panel.

13. A system comprising:
a plurality of UPS modules, each UPS module comprising a UPS input panel, a UPS connected to the UPS input panel, and a UPS output panel connected to the UPS, the UPS comprising an inverter, a rectifier and an internal bypass circuit, the plurality of UPS modules distributing power from a primary power source to a critical load; and
a bypass circuit external to the plurality of UPS modules and connected to the input panel and the output panel of each of the plurality of UPS modules, the bypass circuit comprising a redundant power source, the redundant power source distributing power from the redundant power source to the critical load via the bypass circuit through the input panel of the one of the UPS modules or through the output panel of the one of the UPS modules.

14. The system of claim 13, wherein a supplemental bypass line connects the redundant power source to the bypass circuit.

15. The system of claim 14, wherein the supplemental bypass line is a generator bypass line and wherein the redundant power source is a generator, the generator bypass line connecting the generator to the bypass circuit.

16. The system of claim 13 wherein the critical load is electrically isolated from the UPS module when the power from the redundant power source is delivered through the output panel of one of the UPS modules.

17. The system of claim 13 wherein the primary power source is one or more of a connection to utility and a generator.

18. The system of claim 13 wherein the critical load comprises a plurality of servers and information technology (IT) equipment.

19. The system of claim 13 wherein the redundant power source is one or more of a connection to utility and a generator.

20. The system of claim 13, wherein each of the UPS modules comprises a housing and wherein the housing comprises the UPS input panel and the UPS output panel.

21. A system comprising:
a normal operation circuit branch to deliver power from a first power source or a second power source to a critical load during normal operations, wherein the normal operation circuit comprises a first UPS comprising a first UPS input panel, a first UPS output panel, and a first inverter, a first rectifier and a first internal bypass circuit between the first UPS input panel and the first UPS output panel, a second UPS comprising a second UPS input panel, a second UPS output panel, and a second inverter, a second rectifier and a second internal bypass circuit between the second UPS input panel and the second UPS output panel, and a controller connected to the first UPS input panel and the second UPS input panel; and
a bypass circuit branch external to the first UPS and external to the second UPS and connected to the first UPS input panel, the first UPS output panel, the second UPS input panel, the second UPS output and the critical load, the bypass circuit branch to deliver power to the critical load from a redundant bypass power source during redundant source bypass operations through one of the first UPS input panel, the first UPS output panel, the second UPS input panel or the second UPS output panel, wherein the controller is to control whether the first UPS, the second UPS or the bypass circuit branch delivers power to the critical load.

22. The system of claim 21, wherein a supplemental bypass line connects the redundant power source to the bypass circuit branch.

23. The system of claim 22, wherein the supplemental bypass line is a generator bypass line and wherein the redundant power source is a generator, the generator bypass line connecting the generator to the bypass circuit.

24. The system of claim 21 wherein the critical load is electrically isolated from the normal operation circuit branch during generator bypass operations.

25. The system of claim 21 wherein the redundant power source comprises a redundant connection to utility and a redundant generator, and wherein the bypass circuit further comprises a bypass UPS on the supplemental bypass line and a controller connected to the bypass UPS, the utility and the generator connected to the controller.

26. The system of claim 21 wherein the critical load comprises a plurality of servers and information technology (IT) equipment.

27. The system of claim 21, wherein each of the first UPS and the second UPS comprises a housing and wherein the housing comprises the UPS input panel and the UPS output panel.

28. A method comprising:
energizing a bypass power source, the bypass power source connected to a critical load through an external bypass circuit;
closing an uninterruptible power supply (UPS) input panel external bypass breaker connected to a UPS and the bypass power source through the external bypass circuit at an input panel of the UPS, the UPS comprising an inverter, a rectifier and an internal bypass circuit;
after closing the UPS input panel external bypass breaker, opening a bypass circuit breaker connected to the critical load and the bypass power source through the external bypass circuit at an output panel of the UPS;
after opening the bypass circuit breaker, opening a breaker connected to a primary power source and the UPS input panel;
delivering power from the bypass power source to the input panel of the UPS through the external bypass circuit,
delivering power from the bypass power source from the input panel of the UPS through the inverter and the rectifier to the critical load.

29. The method of claim 28, further comprising performing maintenance on at least one of a controller connected to the UPS, a generator connected to the UPS and a connection to a utility connected to the UPS.

30. A method comprising:
energizing a bypass power source, the bypass power source connected to a critical load through an external bypass circuit, the bypass power source connected to the external bypass circuit through a supplemental bypass line;
opening an uninterruptible power supply (UPS) input panel external bypass breaker at the input panel of the UPS, the UPS input panel external bypass breaker connected to an input of the UPS and an input of the external bypass circuit, and wherein the UPS input panel connects the UPS to a primary power source;
after opening the UPS input panel external bypass breaker, closing a bypass circuit breaker in the external bypass circuit, the bypass circuit breaker connected to the critical load and the bypass power source;
after closing the bypass circuit breaker, opening an output breaker at an output panel of the UPS, the output breaker connected to the UPS and the critical load, wherein opening the UPS input panel external bypass breaker and opening the output breaker electrically isolates the UPS from the critical load; and
after opening the output breaker, de-energizing the UPS;
supplying power to the critical load from the bypass power source through the output panel of the UPS via the external bypass circuit, wherein the bypass power source is different than the primary power source of the critical load, and wherein the external bypass circuit is external to the UPS.

31. The method of claim 30, wherein de-energizing the UPS comprises de-energizing the input panel of the UPS.

32. The method of claim 30, further comprising connecting a load bank to the UPS, re-energizing the UPS and testing one or more of the UPS, a controller connected to the UPS, a generator connected to the UPS and a connection to a utility connected to the UPS.

33. The method of claim 30, further comprising performing maintenance on one or more of the UPS, a controller connected to the UPS, a generator connected to the UPS and a connection to a utility connected to the UPS.

* * * * *